United States Patent [19]

Hurme et al.

[11] Patent Number: 5,754,555
[45] Date of Patent: May 19, 1998

[54] SUBSCRIBER NETWORK ARRANGEMENT FOR CONNECTING SUBSCRIBERS TO A TELEPHONE NETWORK

[75] Inventors: Harri Hurme; Juha Heikkilä, both of Espoo, Finland

[73] Assignee: Nokia Telecommunications Oy

[21] Appl. No.: 564,190

[22] PCT Filed: Jun. 15, 1994

[86] PCT No.: PCT/FI94/00258
§ 371 Date: May 8, 1996
§ 102(e) Date: May 8, 1996

[87] PCT Pub. No.: WO95/01019
PCT Pub. Date: Jan. 5, 1995

[30] Foreign Application Priority Data

Jun. 18, 1993 [FI] Finland ..................... 932818

[51] Int. Cl.⁶ ..................... H04L 5/22; H04Q 11/04
[52] U.S. Cl. ..................... 370/522; 370/524; 348/12; 455/5.1
[58] Field of Search ..................... 370/327, 336, 370/337, 345, 347, 458, 470, 522, 523, 524, 528, 529; 348/12–16; 359/135; 379/90.02, 92.03, 92.04; 455/5.1, 6.3

[56] References Cited

U.S. PATENT DOCUMENTS 4,773,065 9/1988 Kobayashi et al. .
5,027,426 6/1991 Chiocca, Jr. .
5,124,980 6/1992 Maki .
5,367,522 11/1994 Otani ..................... 370/468
5,581,555 12/1996 Dubberly et al. ..................... 370/487

FOREIGN PATENT DOCUMENTS 0 332 818 9/1989 European Pat. Off. .
0 376 527 7/1990 European Pat. Off. .

*Primary Examiner*—Melvin Marcelo
*Attorney, Agent, or Firm*—IP Group of Pillsbury Madison & Sutro LLP

[57] ABSTRACT

A subscriber network arrangement for connecting several subscribers to a telephone network, in which the subscriber network includes (a) several subscriber sets and, (b) several subscriber terminals. To one subscriber terminal is connected at least one subscriber set by use of a transmission connection implemented in an electrical form. The network further includes (c) a central unit common to the several subscriber terminals, whereby a time-division data transmission between the several subscriber terminals and the central unit occurs along a common transmission path. To be able to construct the network at costs as low as possible by utilizing the existing transmission capacity as efficiently as possible, a message transmission channel common to all subscriber terminals of the central unit is formed in the same transmission frame as actual payload data in both transmission directions on the common transmission path between the central unit and the subscriber terminals. The channel is disposable by subscriber-specific signalling messages as well as other signalling messages of the network.

16 Claims, 8 Drawing Sheets

| FRAME NO. | BIT CONTENT IN TIME SLOT TS0 | | | | | | | |
|---|---|---|---|---|---|---|---|---|
| | b1 | b2 | b3 | b4 | b5 | b6 | b7 | b8 |
| F0 | C | KL | KL | KL | KL | KL | KL | KL |
| F1 | (0) | 1 | X | S | S | S | S | S |
| F2 | C | KL | KL | KL | KL | KL | KL | KL |
| F3 | (0) | 1 | X | S | S | S | S | S |
| F4 | C | KL | KL | KL | KL | KL | KL | KL |
| F5 | (1) | 1 | X | S | S | S | S | S |
| F6 | C | KL | KL | KL | KL | KL | KL | KL |
| F7 | (0) | 1 | X | S | S | S | S | S |
| F8 | C | KL | KL | KL | KL | KL | KL | KL |
| F9 | (1) | 1 | X | S | S | S | S | S |
| F10 | C | KL | KL | KL | KL | KL | KL | KL |
| F11 | (1) | 1 | X | S | S | S | S | S |
| F12 | C | KL | KL | KL | KL | KL | KL | KL |
| F13 | SF | 1 | X | S | S | S | S | S |
| F14 | C | KL | KL | KL | KL | KL | KL | KL |
| F15 | SF | 1 | X | S | S | S | S | S |

SUBSCRIBER NETWORK ARRANGEMENT FOR CONNECTING SUBSCRIBERS TO A TELEPHONE NETWORK

This application claims benefit of international application PCT/FI94/00258, filed Jun. 15, 1994 and published as WO95/01019, Jan. 5, 1995.

BACKGROUND OF THE INVENTION

The invention relates to a subscriber network arrangement, which is the part of a telecommunication network which is intended for a subscriber. Such a part of the telecommunication network is often called an access network.

At the construction of a telephone network in a traditional manner, a separate two-wire line has to be drawn from each subscriber to a subscriber exchange or to a subscriber multiplexer. The construction costs caused only by the exchange and possibly by a connection lead of the subscriber multiplexer as well as by the multiplexing circuits can then be divided among all subscribers. A big problem for a new telephone operator (such are generated particularly because telecommunication legislation is becoming more liberal than before) is thus how to construct a network at substantially lower costs to make it competitive with the networks maintained by already existing telephone operators.

SUMMARY OF THE INVENTION

Accordingly, the object of the present invention is to provide a network arrangement, by means of which the above object can be achieved and by means of which the already existing transmission capacity can be utilized as well as possible at the same time. This is achieved by means of a point-to-multipoint network arrangement.

The idea of the invention is to provide telephone services as a point-to-multipoint network by means of a plurality of subscriber terminals and a common central unit implementing exchange interface and to generate in such a multipoint system a common message-based transmission channel in a transmission frame to be used on a transmission path common to all subscriber terminals between the central unit and the subscriber terminals as well as to transmit all messages to be transmitted in the system on such a message-based transmission channel.

Thanks to the solution of the problem, as provided by the invention, the transmission capacity already available can be utilized as efficiently as possible each time. The system can also be made flexible, since it allows, besides a transmission of all necessary control messages on the same channel, also an easy implementation of concentration, for instance. Through combining the different needs of message transmission into one single group of messages, efficient signalling as to transmission capacity will be possible, for example, and the equipment required will be cheaper and simpler than before, without anything from the flexibility getting lost which is offered as such if the different needs of signalling are kept apart.

BRIEF DESCRIPTION OF THE DRAWINGS

The invention and its preferred embodiments will be described below in more detail with reference to the examples according to the attached drawings, in which.

DETAILED DESCRIPTION

Figure 1:
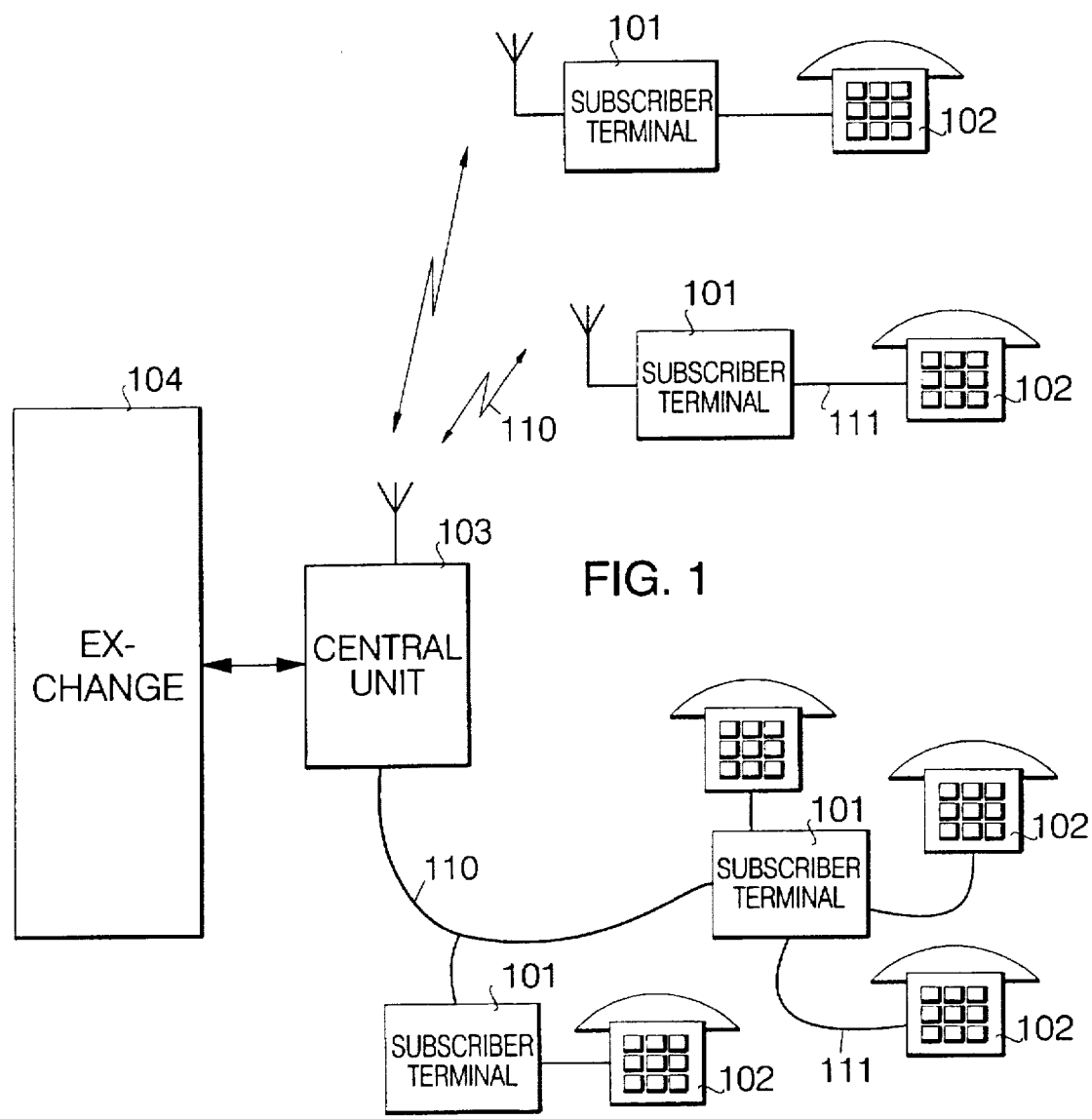
FIG. 1 shows a subscriber network according to the invention.

FIG. 1 shows a subscriber network according to the invention, implemented by means of a time-division multipoint access. The network comprises several subscriber terminals 101, each of them being connected to a telephone set of one or several subscribers or to another similar telecommunication terminal 102, as well as a central unit 103 common to all of the subscriber terminals. The central unit is a device establishing a multipoint connection and connecting the subscribers to an exchange 104 of a Public Switched Telephone Network (PSTN). As interface is used one of the standardized digital interface methods, such as V2 or V5.1 or V5.2, which (last-mentioned) also makes a concentration possible (more subscribers than time slots).

The subscriber terminals 101 may be devices positioned at a subscriber, or a subscriber terminal may be a subscriber multiplexer known per se, such as the ACM2 subscriber multiplexer of Nokia, to which are added e.g., a modem establishing an RF connection and framing circuits required for forming a transmission frame to be sent from a subscriber towards the exchange.

A transmission channel 110 between a subscriber terminal and the central unit may be a radio channel, e.g. a coaxial cable of a cable television network or a passive optical network, as will be described later. Combinations of these may also be used in such a way that physical transmission media forming a transmission path are different in different transmission directions. This is an advantageous manner, e.g. in cases when a fixed one-way distribution network already exists, whereby uplink direction may be implemented by radio, for instance.

A copper cable 111 extending from a subscriber terminal to a subscriber set 102 is very short in practice, maximally perhaps about 100 m.

Figures 2A, 2B:
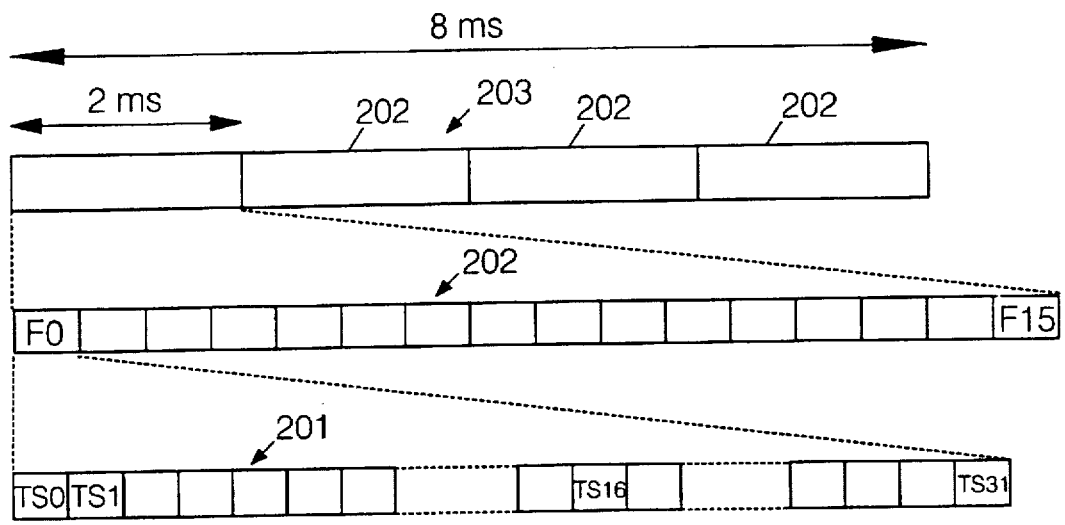
FIG. 2a shows a frame structure to be used for downlink connections in the network according to the invention.
FIG. 2b shows bits to be transmitted in time slots TS0 of consecutive frames of one multiframe for downlink connections.

A downlink connection, i.e. a connection from the central unit to a subscriber terminal is implemented according to the invention by modifying a standard 2048 kbit/s frame structure as little as possible, but still in such a way that the multiplexing system known per se, in the frame structure of which separate signalling bits are allocated for each subscriber, is changed over to the use of message-based signalling. The changes relate to the structure of time slot zero (TS0), and time slot 16 (TS16) is freed from signalling for some other purpose. FIGS. 2a and 2b show the downlink frame structure in such a way that FIG. 2a illustrates the actual frame structure and FIG. 2b the signalling to be transmitted in time slot zero (TS0). Reference numeral 201 indicates a frame of the 2048 kbit/s basic multiplexing system known per se, which frame is divided into 32 time slots TS0 ... TS31, the time slots TS1 ... TS15 and TS17 ... TS31 constituting speech channels in a known manner. In the system, sixteen successive frames F0 ... F15 constitute a multiframe 202, which is 2 ms long. Multiframes of the sixteen frames may further constitute a superframe 203, the length of which is, e.g., four multiframes and the duration 8 ms, accordingly.

According to the invention, to time slot zero (TS0) is added a message-based transmission channel consisting of free bits of odd frames, as shown in FIG. 2b. In time slot zero, the bits indicated by reference mark S are bits of a signalling message according to the invention, the bits indicated by reference mark KL are frame alignment bits, the bits indicated by reference mark C are CRC4-bits, by means of which the quality of the connection is monitored, the bits indicated by reference mark SF inform the number of the multiframe and the bits indicated by reference mark X are stuffing bits of no significance. Bits b1 of the odd frames, circled in FIG. 2b, constitute a multiframe alignment word according to the CCITT recommendations. Subsequent bits (b2), set as ones, inform that the frame in question has no frame alignment word.

From the bits to be transmitted in time slot zero, the signalling bits and the superframe bits are associated with the invention, the other bits are in accordance with the CCITT recommendations.

Figure 3:
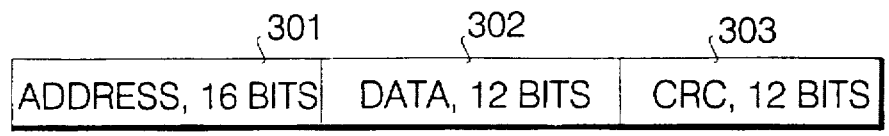
FIG. 3 shows a structure of a signalling message to be used for downlink connections.

Consequently, signalling required by telephone connections is not transmitted by means of bit patterns of time slot TS16 (as is done in the known basic multiplexing system), but by the signalling bits S of time slot zero, by means of which bits signalling messages according to FIG. 3 are generated. One message is constituted by signalling bits transmitted during one multiframe, the length of the message being 40 bits (5 bits in a frame, 8 frames in a multiframe). A signalling message consists of a 16 bit address section 301 informing of the address of the subscriber, a 12 bit data section 302 subsequent to the address section as well as an also 12 bit error check section 303 subsequent to the data section. Since the messages are sent along the common transmission path to all subscriber terminals, a subscriber terminal receives a message intended for it only when it finds its own identifier at the beginning of the message.

Alignment word included in time slot TS0 simultaneously serves as a time signal of the subscriber terminals, by means of which signal they synchronize their uplink messages.

In the network arrangement according to the invention, messages transmit, besides subscriber signalling, also the additional signalling required by network management and multipoint connection. It is possible to send signalling messages of different types on one and the same channel, because a POTS (Plain Old Telephone Service) interface requires only little signalling, which can be attended to by a small number of messages. On the other hand, the number of different signalling messages and the need of signalling required by a multipoint connection are so small compared with the transmission capacity of the message channel generated in time slot TS0 that all signalling needs can be attended to on one and the same channel. Efficient signalling in a point-to-multipoint network is made possible by the fact that the different needs of signalling are combined into one single group of messages. To the group of messages to be transmitted on the same channel belong thus all types of messages associated with the operation of the network; such messages are, besides call setup and disconnect messages, also network management messages, different acknowledgement messages and specific messages allocated for specific purposes, e.g. power adjustment messages. The same solution concerns also the other transmission direction, which will be described below in greater detail.

When the message structure shown in FIG. 3 is used, 4096 ($2^{12}$) different messages are in use, only 20 to 30 of those messages being used for the needs of signalling mentioned above. Consequently, the system is flexible also for future needs.

Possible synchronization data of a superframe is transmitted by the bits SF. These bits make it possible to form a superframe, the length of which is a multiple of 2 ms. This may be necessary, because an uplink connection is synchronized by means of a time signal received from downlink multiframe synchronization, and it may be preferable to use a multiframe structure of more than 2 ms for an uplink connection. Though FIG. 2a shows the length of the superframe to be four multiframes (which is the maximum number informable by two bits, if the ordinal number changes in each frame), the superframe may be even longer, e.g. eight multiframes, in such a way that every eighth multiframe has a value determined by the SF bits, e.g. 11.

In principle, some other time slot may also be used for signalling, but time slot TS0 is advantageous in so far that it already comprises frame and multiframe synchronization and it also has a sufficient capacity for implementing message-based signalling. The modification method described above is advantageous also in the sense that the downlink frame structure thus resembles existing solutions as much as possible, due to which the modification to be made in the central unit is as simple as possible. A utilization of the frame structure of expressly the 2 Mbit/s multiplexing system is advantageous also for the reason that the most probable alternative for implementing exchange interface is the 2 Mbit/s interface.

An uplink connection, i.e. a connection from a subscriber terminal to the central unit, is implemented in a manner clearly deviating from a downlink connection, but yet using in the same way a common message-based transmission channel placed at the disposal of all signalling messages of the network.

When planning an uplink frame structure, the most substantial fact to be considered consists in transit time differences between subscriber terminals, caused by different distances between the subscriber terminals and the central unit. When time-division technique is used, the different transmission path delays between the different subscriber terminals and the central unit result in that the transmissions of the subscriber terminals occur at different moments in the time slots. This problem could be solved by using bursts clearly shorter than the time slot as transmission bursts, whereby even a delayed burst in whole would hit the time slot. This leads, however, to a very inefficient use of transmission capacity. Accordingly, a more efficient way is to measure the transmission path delays of the different subscriber terminals and to teach each subscriber terminal separately the correct transmission moment. Because of finite switching-on and switching-off times of transmitters and receivers, guard areas shall be arranged also in this case at the beginning and end of a transmission burst, during which guard areas no payload bits are transmitted.

When the transmission capacity of a connection shall be utilized accurately, the total length of the guard areas must remain as short as possible. Because rise times of transmitters cannot be influenced without widening the spectrum, the only possibility is to assemble transmission bursts to as long messages as possible, due to which the relative share of the guard areas remains small. This solution is also associated with its own problems, for strict demands are made on the longest permitted loop delay of the subscriber connections (loop delay signifies the total delay of the connections exchange→subscriber and subscriber→exchange), the loop delay may typically be 2 ms at the most. This sets an upper limit for the longest possible length of a transmission burst, since e.g. a 2 ms multiframe, in which each subscriber has one transmission turn, causes a 2 ms loop delay as a mere framing delay already.

For the purpose of the subscriber terminals learning the correct transmission moments, a measurement of transmission path delays shall be arranged in the network. The delay measurement could be arranged by sending delay measurement bursts shorter than normal transmission bursts through normal time slots. Then the delay measurement bursts fit into the time slots, though the transmission moments are not the best possible. However, a drawback of such a solution is that the length of the time slots is optimized according to the longest permitted loop delay. Since a delay measurement burst cannot be infinitely short, the length of the time slot sets an accurate limit to the longest transmission difference permitted in the network, which limit cannot be exceeded without special arrangements. Accordingly, such a method is not the best possible for a network operator.

In addition to the above facts, it must be possible, when planning an uplink frame structure, to arrange a signalling channel in the uplink direction. The signalling channel could be positioned in connection with the transmission bursts, whereby each subscriber terminal would have its own signalling channel in continuous use. As far as the use of the transmission capacity is concerned, this is, however, rather inefficient, because the need of signalling of the telephone connections is so little that the signalling channels stay unused for most of the time.

Consequently, planning an uplink frame structure is a very complicated optimization to be made with respect to many variables. Compromising to facilitate the optimization leads easily, at least with respect to some variable, to a rather non-optimal final result. To solve the new problems arising from the non-optimal frame structure by other means inevitably results in that the device will be unnecessarily complicated, which, naturally, is not desired.

Figure 4A:
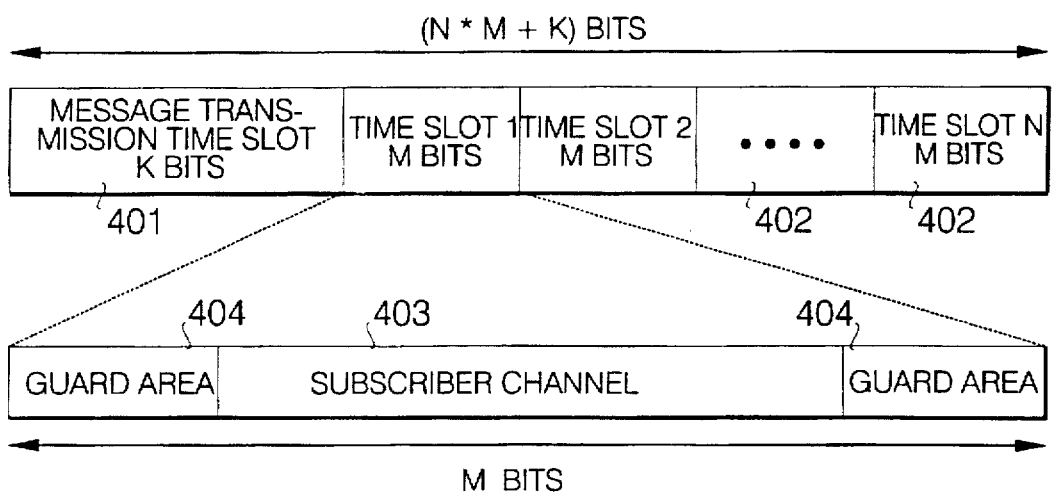
FIG. 4a shows a frame structure to be used for uplink connections in the network according to the invention.

The requirements presented above can be met by means of the uplink frame structure of the invention, illustrated in FIG. 4a. The frame consists of one long message transmission time slot 401 and several shorter time slots 402 allocated for the subscribers to transmit data (speech or data transmission) (i.e. typically K>>M). Each time slot allocated for data transmission comprises an actual subscriber channel 403, at both ends of which there is a guard area 404 of a few bits.

Figure 4B:
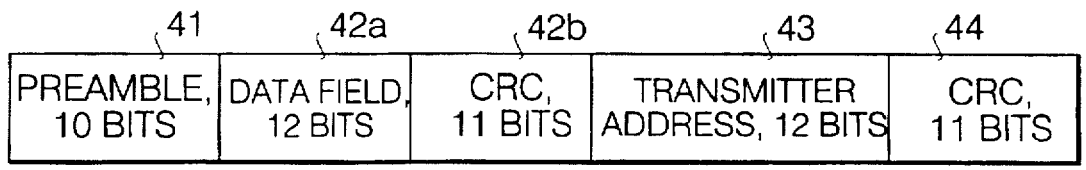
FIG. 4b shows a burst to be sent in a message transmission time slot of the uplink frame structure.

One subscriber terminal (which may contain more than one subscriber) at a time uses the message transmission time slot. A burst to be sent in the message transmission time slot thus comprises an identifier of the transmitting subscriber terminal. FIG. 4b illustrates the structure of the burst. At the beginning of the burst, there is a 10 bit preamble section 41 acting as a guard area. After this follow a 12 bit data field section 42a and an 11 bit CRC section 42b of the data field. The end part of the burst consists of a section 43 (12 bits) informing of the address of the transmitter, and a subsequent address checking section 44 (11 bits). If a collision occurs in the message transmission time slot between two subscriber terminals, retransmission times are allotted, i.e. after how many frames a retransmission is performed. The Slotted Aloha protocol known per se, for instance, may be used for signalling, which protocol is described in more detail, e.g. in reference [1] (in the list of references provided at the end of this Detailed Description).

For a practical implementation of the equipment, it is preferable to select as uplink bit rate the same rate which is used in downlink direction, i.e. 2048 kbit/s, for instance. Then it is simpler to generate e.g. the clock signals required. By making the following selections, for instance:

number of data transmission time slots N=54,
  length of data transmission time slots M=72 bits, and
  length of the message transmission time slot K=208 bits,
   4096 bits in total are obtained for an uplink frame, whereby the duration of the frame (at bit rate 2048 kbit/s) is 2 ms, which corresponds to the time required for a transmission of a downlink multiframe.

According to one preferred embodiment of the invention, several time slots are allocated from one frame for the same subscriber, e.g. in such a way that the subscriber obtains a transmission turn at 1 ms intervals (though there is only one message transmission time slot in the frame). Then, the duration of a loop delay caused by framing stays at 1 ms. The long message transmission time slot 401 is utilized according to another preferred embodiment of the invention also in such a manner that the central unit 103 measures transmission path delays from a signalling message sent by the subscriber terminal 101 on the common message-based transmission channel.

By means of the uplink frame structure according to the invention, also the transmission capacity can be utilized as efficiently as possible, since the length of the time slots used for data transmission can be optimized so that the relative share of the guard areas remains as small as possible. However, the length of a loop delay can be adjusted simultaneously by means of the number of time slots to be allocated for one subscriber. With only one message transmission time slot in the frame, the relative transmission capacity allocated for signalling can be decreased by sending the bursts containing a payload signal more than once in a frame. In principle, message transmission time slot may occur also less than once in each frame, e.g. in every fourth frame only, whereby it can be even longer, respectively.

According to a preferred embodiment of the invention, time slots adjacent to the message transmission time slot 401 can also be used temporarily by the message-based transmission channel to widen the message-based transmission channel temporarily.

A delay measurement can be combined with a transmission of signalling messages in such a way that the subscriber terminals try to send their messages always at a predetermined moment of the message transmission time slot, preferably in the middle. When the central unit receives the signalling message, it measures simultaneously the position of the message with respect to the frame structure. By means of this information, a subscriber-terminal-specific relative transmission path delay can be determined. When the exact starting moment of the message is known, the transmission path delay of a subscriber terminal can be adjusted towards the correct value (the central unit informs the subscriber terminal of the correction time, which is added to the delay value stored in a memory of the equipment). After the adjustment, the transmission moment of the subscriber terminal is set in such a way that, though the lengths of the guard areas are as small as possible and the data transmission between the subscriber terminals and the central unit thus is as efficient as possible, transmission bursts of two subscriber terminals at different distances do not overlap each other in the signal received by the central unit.

By means of the length of the message transmission time slot, it is possible to determine the length of the differential transmission path delay permitted between different subscriber terminals. When the message transmission time slot is lengthened, longer delay differences become possible because of increasing guard areas around the signalling burst. Another possible alternative for allowing bigger delay differences would be to use empty time slots for delay measurement. In this arrangement, time slots adjacent to the message transmission time slot are normally not allowed to be used for utility purposes. Then a subscriber terminal can send a signalling message, which can even have a considerable initial delay error. In such an arrangement, no new subscriber terminals can be connected to the system during rush-hours, because free time slots are not available then.

If the uplink and downlink bit rates are equal according to the above, the uplink and downlink transmission capacities are different. This is due to the transmission capacity taken up by the guard areas between the uplink message transmission time slot and the transmission bursts. Since there is more transmission capacity in downlink direction than in uplink direction, part of the downlink time slots can be used for generating one-way information channels, for instance. These information time slots can preferably be used for adding extra services to the system or for sending commercials or notices of failure, for example.

The network arrangement described above, using message-based signalling, also makes an easy implementation of concentration possible (concentration signifies that the arrangement has more subscribers than the frame structure has time slots). When a subscriber terminal is in idle state, it monitors the message-based transmission channel only, observing the address of the message, i.e. traffic time slots do not need to be monitored at all. When the time slots are not allocated fixedly to the subscribers, but an allocation of a time slot is made by means of an offhook signalling message, the system becomes concentrating. When the system is jammed, some downlink information time slot, for instance, may be allocated as a time slot and it can also be looped to an outside A subscriber.

Figure 5A:
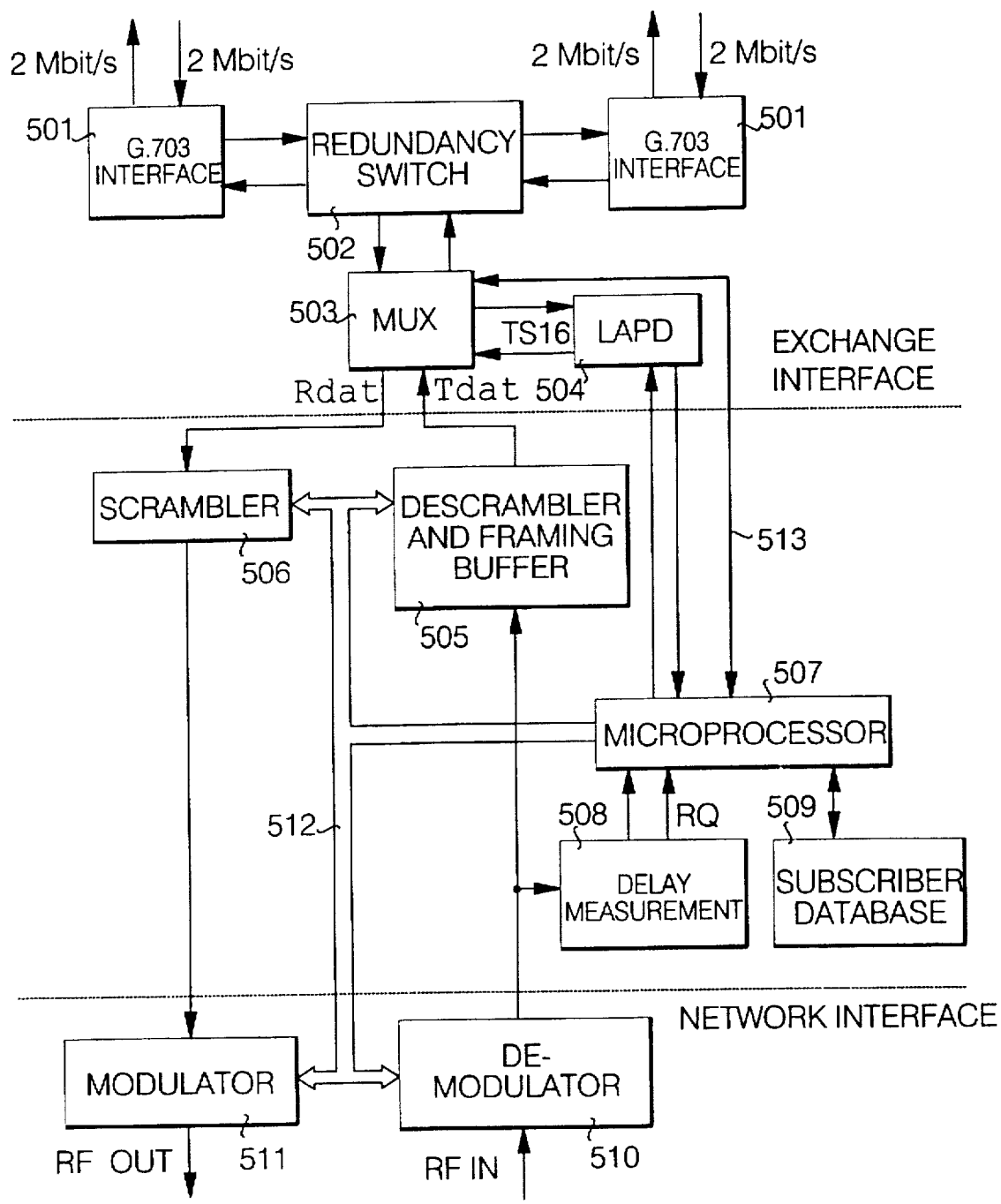
FIG. 5a shows a block diagram of a structure of a central unit common to the subscribers of the network.

FIG. 5a illustrates the structure of the central unit 103 as operative blocks. In downlink direction, a 2 Mbit/s signal is connected to the central unit through a G.703 interface 501. (The interface is defined in the CCITT recommendation G.703.) To secure the operation of the equipment, the G.703 interface is duplicated, due to which only one of the 2 Mbit/s signals is connected forward through a redundancy switch 502. The other interface 501 is a standby interface in a normal situation. Both interfaces are bidirectional, which means that both a 2 Mbit/s signal to be received and a 2 Mbit/s signal to be transmitted pass through them.

From the redundancy switch 502, the signal is connected to a multiplexer circuit 503 performing the signal processing required by the 2 Mbit/s interface. The multiplexer circuit separates the signalling information contained in time slot TS16 and the signalling data can be obtained out of the circuit through a pin reserved for this purpose. Time slot TS16 to be transmitted to the exchange 104 can be applied to the circuit over a pin reserved for this purpose, or the data can be written by means of a microprocessor 507 into a RAM inside the circuit through an address and data bus 513 of the microprocessor. It is possible to read from or write to the time slot zero through the memory inside the circuit. Received binary data is obtained out of the multiplexer circuit 503 to a pin Rdat and data to be transmitted towards the network (to the exchange 104) is applied to a pin Tdat. These interfaces operate at the rate of 2 Mbit/s and the frame structure of the signals is the standard frame structure used for 2 Mbit/s interfaces. The operation of the multiplexer circuit is not discussed in more detail in this connection. The operation of the circuit is described in detail in reference [2], to which the interested reader is referred for a more extensive description.

A signalling message to be sent in downlink direction is arranged in free bits of time slot zero (TS0), as has been set forth earlier in connection with FIG. 2b. This operation is made in the memory inside the multiplexer circuit by means of the microprocessor 507 through the bus 513. The signalling received through the 2 Mbit/s interface and contained in time slot TS16 is applied directly to a processing circuit 504 using LAPD Protocol (Link Access Protocol D is a connection praxis known per se). The V5.2 interface is used as exchange interface in the example of the figure, whereby the signalling takes place as messages and the messages are sent by means of the LAPD. If the exchange interface is some other interface, LAPD processing is not absolutely necessary. From the LAPD circuit, the signalling message is led to the microprocessor 507.

The received Rdat signal passes then to a data scrambler 506, the purpose of which is to secure that a bit string going to a modulator 511 does not contain too long strings of ones or zeroes. A correct operation of the modulator presupposes that a sufficiently random bit stream is applied thereto. Another purpose of the scrambler 506 is to encrypt speech.

The scrambled bit stream is led to the modulator, which modulates the signal to radio frequency. As modulation method can be used, e.g., CPM modulation or 4-PSK modulation; there are several alternatives to the downlink modulation method, because reception may be coherent. The frequency to which the signal will be modulated can be set by means of a programmable synthetizer (not shown) located in the modulator. The synthetizer is connected to a control bus 512 of peripheral devices, through which bus the microprocessor can set the frequency of the synthetizer. The RF signal generated by the modulator can then be amplified and added by means of a power summer to a signal to be sent to a cable television network, for example. Detailed implementation of the network interface depends on the transmission medium used, which also influences the selection of the modulation method. (Network and exchange interfaces are shown by broken lines in FIG. 5a.)

In uplink direction, an incoming signal is at first demodulated to base frequency. In the basic form of the invention, demodulation is differential. Since the central unit is common to a great number of subscribers, a coherent reception is also possible, though it is rather complicated in this connection. A demodulator 510 comprises a frequency synthetizer (not shown) to be controlled by the microprocessor 507, by means of which synthetizer the reception frequency can be set regardless of the transmission frequency. As known, the described direct receiver can be replaced by super receivers and transmitters containing also intermediate frequencies. In connection with a demodulator, the data clock of a received bit stream is also usually regenerated. Due to delay equalizing method, the equipment according to the invention does not absolutely require a regeneration of the clock.

The received bit stream is then led to a descrambler 505, which changes the data stream back to a normal PCM signal. In connection with a descrambler, a data buffer and a framing unit are also necessary. By means of these, the frame structure to be used for uplink connection is converted back to a standard 2 Mbit/s frame structure (which is used for a connection between the central unit and the exchange). Buffering is needed for the conversion, since the uplink messages arrive as long bursts and they must be disassembled into normal 8 bit time slots. After framing, a signal is generated which can be applied directly to the Tdat pin of the multiplexer circuit 503. The 2 Mbit/s signal to be sent towards the exchange is preferably provided with the data of time slot zero from the memory inside the multiplexer circuit, into which memory it was written by the microprocessor. The signalling of time slot TS16 arrives directly from the LAPD circuit 504. After the multiplexer circuit, the signal passes through the redundancy switch 502 and the G.703 interface 501 to the network.

Uplink signalling messages are processed by means of a block 508 planned for delay measurement and signalling processing. This can be done, since the demodulated bit stream is led both to the descrambler and the delay measuring block. At the latest when the uplink message transmission time slot 401 is in turn, the delay measuring block is activated and begins to search in the incoming bit stream for an alignment word contained in the signalling burst by means of a correlator (not shown). After the alignment word has been found, the block stops the delay measurement and controls the correctness of the received message by means of the CRC. If no bit errors exist in the message, the address of the message transmitter, the message and the measured delay are stored in the memory to wait for processing in the processor. After a successful reception of the message, an interrupt request RQ can be sent to the processor.

The microprocessor 507 controls the operation of the central unit through the control bus 512 of the peripheral devices and the operation of the multiplexer circuit directly by means of the memory inside the circuit. The processor performs the transmission of the message traffic required by the protocol of a multipoint connection by means of the internal memory of the multiplexer circuit and, on the other hand, reads the received messages from an intermediate memory of the measuring block 508. Signalling towards the exchange is performed in the exchange interface of the figure through the LAPD circuit 504, which receives the signalling messages coming from the multiplexer circuit and, on the other hand, applies to the circuit the outgoing messages it has received from the processor. In addition to this, the processor has at its disposal a subscriber data base 509 to be utilized for network management operations.

Figure 5B:
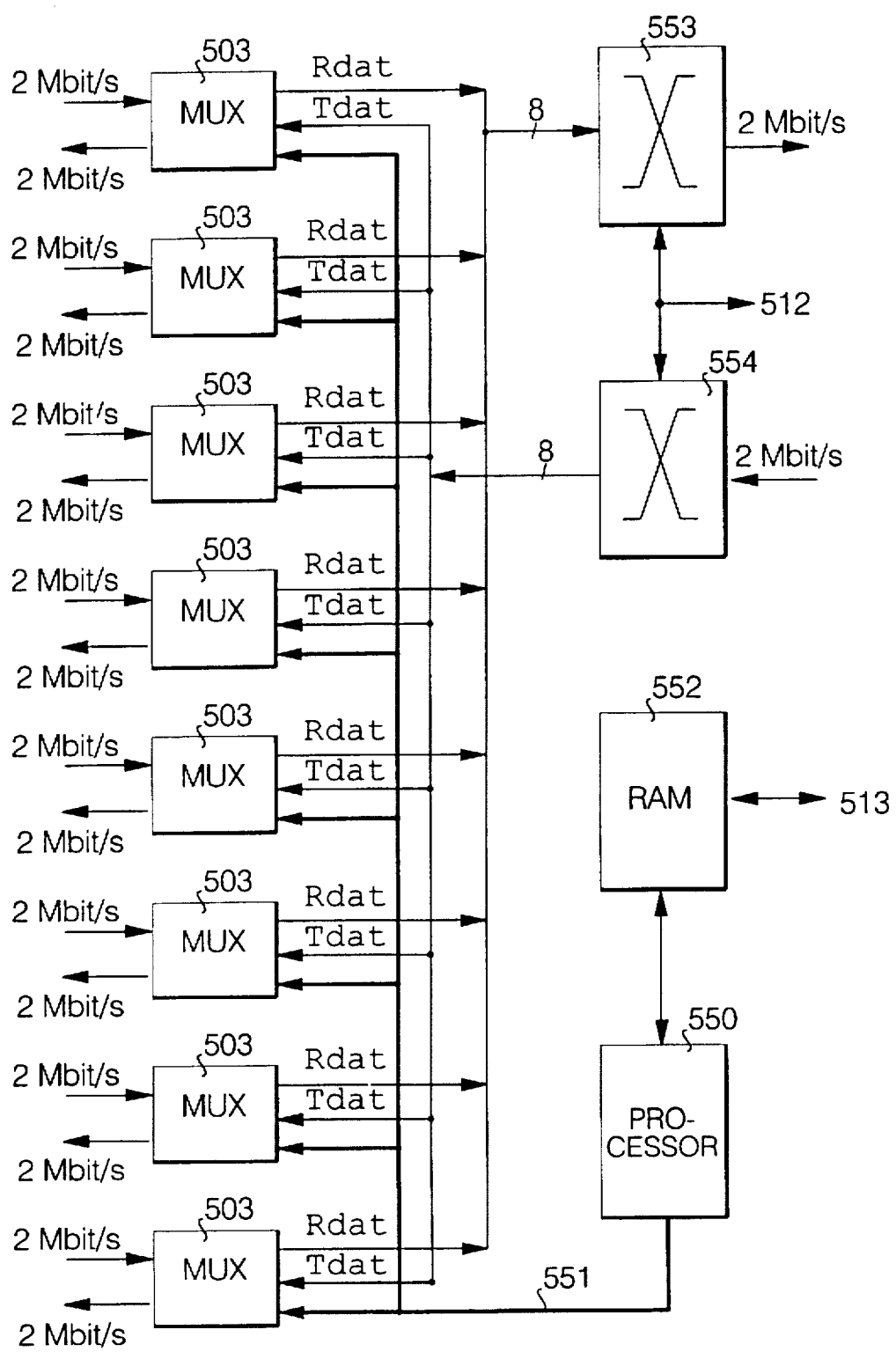
FIG. 5b shows an alternative manner of implementing exchange interface.

In the central unit illustrated in FIG. 5a, the exchange interface used was a V5.2 interface, in which a connection between the subscriber network and the telephone exchange was concentrated. Exchange interface can also be implemented in an alternative manner shown in FIG. 5b by using a V2 interface known per se (not allowing concentration). The exchange interface may contain, e.g., eight multiplexer circuits 503, by means of which 240 subscriber-specific time slots are brought into the central unit. (FIG. 5b does not show the G.703 interfaces 501 preceding the multiplexer circuit.) The multiplexer circuits are connected directly to data and address buses 551 of a processor 550 of the exchange interface, through which buses the processor controls the multiplexer circuits. In the V2 interfaces, signalling is based on time-slot-specific signalling bits to be transmitted in time slot TS16, and therefore, the exchange interface has to convert bit-based signalling to message-based signalling for downlink connections and, for uplink connections, the signalling messages have to be converted to time-slot-specific bit patterns. The conversion is attended to by the processor 550 belonging to the exchange interface, which processor performs the conversion into the memory of the previously described multiplexer circuit 503 (FIG. 5a) located on the central unit side. (The eight parallel multiplexer circuits of FIG. 5b are provided with the same reference numeral as the multiplexer circuit on the central unit side, because the circuit in question is the same circuit known per se.) The processor 550 of the interface communicates with the microprocessor 507 of the central unit through a two-gate RAM 552.

A received 2 Mbit/s signal is indicated in the figure by reference mark Rdat and a 2 Mbit/s signal to be transmitted by reference mark Tdat, respectively. From the time slots of the signals to be received are each time selected by means of an (8-channel) cross-connection unit 553 the active time slots which will be connected to the subscriber terminals. In opposite direction, the selection is made by a cross-connection unit 554, by which the connection is made to one of the eight 2 Mbit/s signals.

By using an exchange interface as described in FIG. 5b, the subscribers can be packed as efficiently as possible in the section on the exchange interface side, which means that the exchange interface can be performed by as few 2 Mbit/s interfaces as possible.

Figure 6:
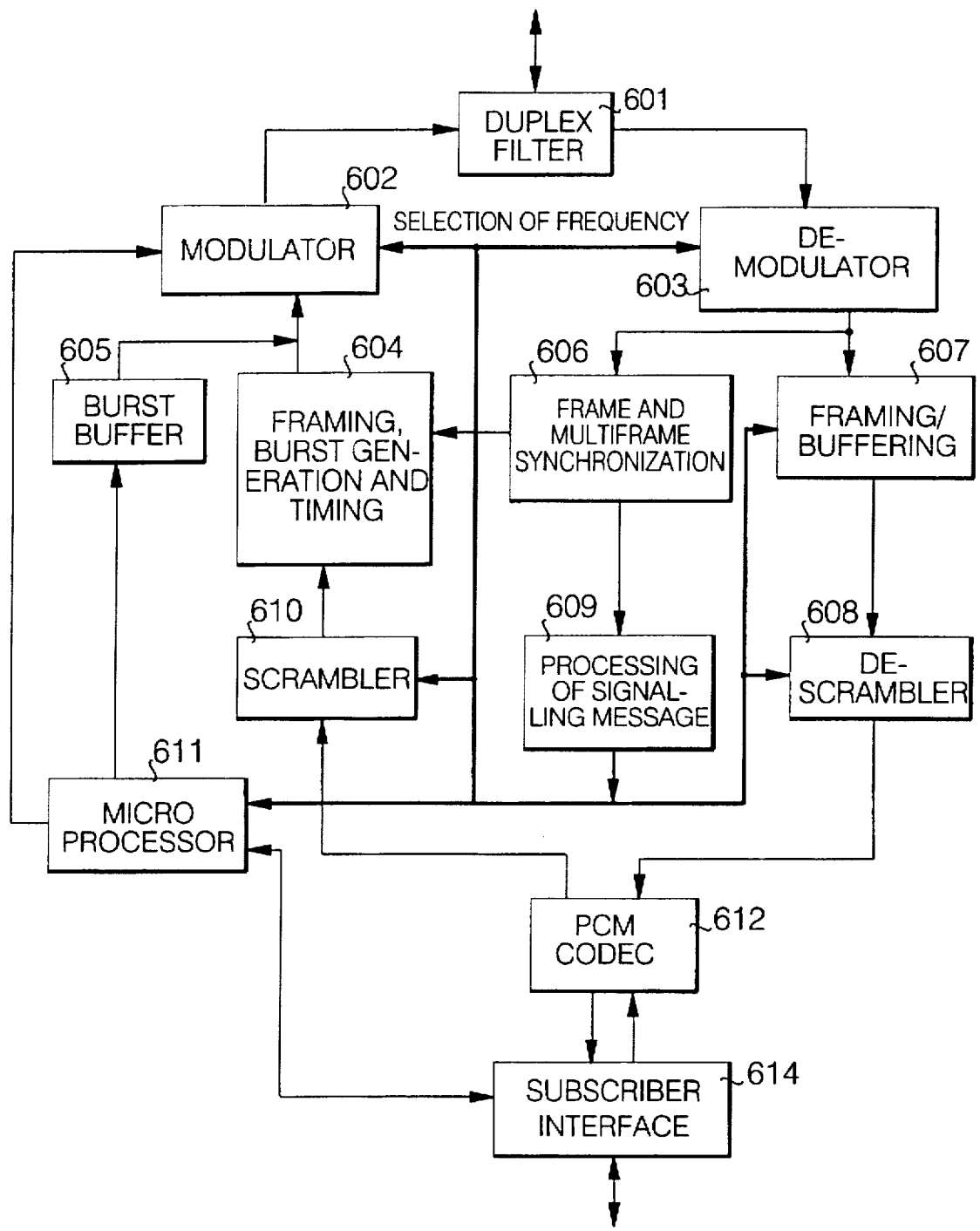
FIG. 6 shows a block diagram of a subscriber terminal of one subscriber.

FIG. 6 shows the structure of a subscriber terminal used by one subscriber as operative blocks. A subscriber terminal supporting several subscribers has fully identical main functions. Only part of the equipment, especially the subscriber interface, shall be multiplied, while the remaining part continues to be common to all subscribers. Through a duplex filter 601, the subscriber terminal receives downlink transmission from the central unit at a frequency selected by a microprocessor 611 by means of a controllable frequency synthetizer (not shown) located in a demodulator 603. A subscriber terminal at fixed frequency is also possible. The demodulator detects the received bits and regenerates the downlink bit clock. By means of the regenerated bit clock, a clock oscillator of the subscriber terminal is phase-locked to the bit clock sent by the central unit in downlink direction.

In the detected bit stream, a frame alignment word is searched for in a synchronization unit 606, by means of which word an alignment to a 125 µs frame structure shall be implemented. After the frame alignment, a multiframe alignment word is searched for in time slot zero. Frame, multiframe and superframe synchronizations may also be performed simultaneously. When being fully synchronized with the downlink frame structure, the subscriber terminal begins to monitor signalling messages in time slot zero. This takes place in a message processing unit 609. The subscriber terminal identifies the signalling messages intended for it by means of a receiver address included in the message. When a message provided with one's own address or with the address of one's own group is detected, a CRC is calculated for the message, which check is compared with a CRC word sent in the message. Address checks and CRCs may also be combined. When a check is successful, the address and the data field of the message are stored in the memory of the message processing unit and an interrupt request RQ is sent to the microprocessor 611 of the subscriber terminal.

When the subscriber terminal is in an active operative state, e.g. has an ongoing call, the detected bit stream is led from the demodulator 603 to a framing and buffering block 607, which selects the time slot addressed by the microprocessor 611 from the downlink bit stream. Then the selected time slot is applied to a data descrambler 608, which removes from the bit stream the scrambling bit string possibly added thereto in the central unit. Speech coding can be used in the system, whereby an ADPCM transcoder (not shown) can be positioned next to the descrambler.

Subsequently, the bit stream is led to a section constituting a telephone interface, in which the initially PCM-coded speech is converted back to an analog form by means of a PCM codec 612. An analog signal is applied through an analog subscriber interface circuit 614 to a subscriber set. The subscriber interface circuit supplies the operating voltage required by the telephone set. For a short subscriber line, a ringing voltage can be generated from the operating voltage, e.g. by reverting the polarity of the operating voltage in synchronism with 25 Hz. The subscriber interface circuit also forwards invoicing pulses received by the microprocessor 611.

In addition to the functions mentioned above, the subscriber interface circuit detects the state of the telephone handle, i.e. on/off-hook information, and pressing an earthing button. These data are transmitted to the microprocessor of the subscriber terminal, and the processor sends the required signalling messages towards the exchange. By means of the on/off-hook information, the microprocessor is capable of calculating a number dialled with an impulse telephone and transmitting the number information to the central unit. When tone dialling is used, the dialled number is identified in the telephone exchange.

In transmission direction, the analog speech is coded in a PCM codec (612) to 8 bit samples, and if ADPCM coding is used, the PCM samples are converted further to shorter ADPCM samples. The speech coded to binary speech is applied to a scrambler 610, in which a scrambling sequence is added to the bit train. The microprocessor 611 controls the operation of the scrambler.

The scrambled bit stream is applied to a framing block 604, which assembles packages in the form of uplink transmission bursts from the speech samples to its own RAM. The framing block receives from the downlink synchronization block 606 a timing pulse, which determines, together with delay correction and time slot selection messages received by the microprocessor, the correct transmission moment. When the subscriber terminal gets the transmission turn, the framing block 604 starts reading a transmission burst from its memory to the input of the modulator 602. The microprocessor 611 loads a control counter (not shown) of the transmitter, associated with the modulator, with an accurate starting moment of the transmission, on the basis of which the subscriber terminal starts transmitting at the right moment.

Message bursts are formed in the RAM acting as a buffer memory, which RAM may be the same memory as is used for speech buffering. The microprocessor generates a signalling message by means of its own software and writes it then in that buffer memory. The processor also calculates the CRC required for checking the message. After the signalling message has been written in the memory, the processor commands the message to be sent in the following message transmission time slot. If the message is not acknowledged, e.g. due to a collision on the message-based transmission channel, the processor allots a new transmission moment for itself, as mentioned previously.

The modulator 602 can perform a differential coding of an incoming bit train and modulates the bit stream to the frequency selected by the microprocessor. The transmission frequency is selected by means of a controllable frequency synthetizer (not shown) located in the modulator. The modulator is followed by the other components of the network interface, such as, e.g., a power amplifier (not shown), the duplex filter 601 and an antenna (not shown). In a PON (i.e. a passive optical network), the modulation is followed by a laser transmitter connected to an optical fibre.

One very preferred application of the solution according to the invention is a cable television telephone. Cable television telephone signifies a telephone connection established through a cable television network. In cable television network, a bidirectional data transmission has been provided by generating at low frequencies (5 to 30 MHz) a backward channel, on which data can be transmitted from a subscriber towards the midpoint of the network. This backward channel is used for instance for implementing interactive cable-TV services. The backward channel is implemented in such a way that the intermediate amplifiers comprise two separate amplifiers, one of them amplifying a downlink frequency band transmitting television programs and the other one a low-frequency band in uplink direction. The amplifier connection shall, of course, be provided with band pass filters in order not to make the circuit unstable. A telephone connection according to the invention may be established through a cable television network by transmitting an information stream towards a subscriber on a free cable television channel and by establishing an uplink connection at low frequencies. A typical frequency band of a cable television network is divided into following parts:

5 to 30 MHz: uplink frequency band
50 to 600 MHz: cable television channels
600 to 650 MHz: downlink frequency band
650 MHz to - : future systems.

These frequencies may be different in different networks, details of the used transmission medium are not important for the invention. Telephone channels to be transmitted towards subscribers may be positioned in the upper part of the frequency band within the range of free cable television channels (600 to 650 MHz range), which range cannot be used for transmitting an analog video signal, because the amplification of the intermediate amplifiers is too low in this frequency range or it has frequency slope. For establishing telephone connections, the amplification is sufficient, however. (This may require a use of a slope equalizer in the transmitter.) Part of the frequency range of the backward channel is used for data transmission of cable television home terminals (11 MHz carrier wave), but an uplink telephone connection can be established in the frequency range of 12 to 30 MHz, in which there is a 18 MHz free frequency band.

Figure 7:
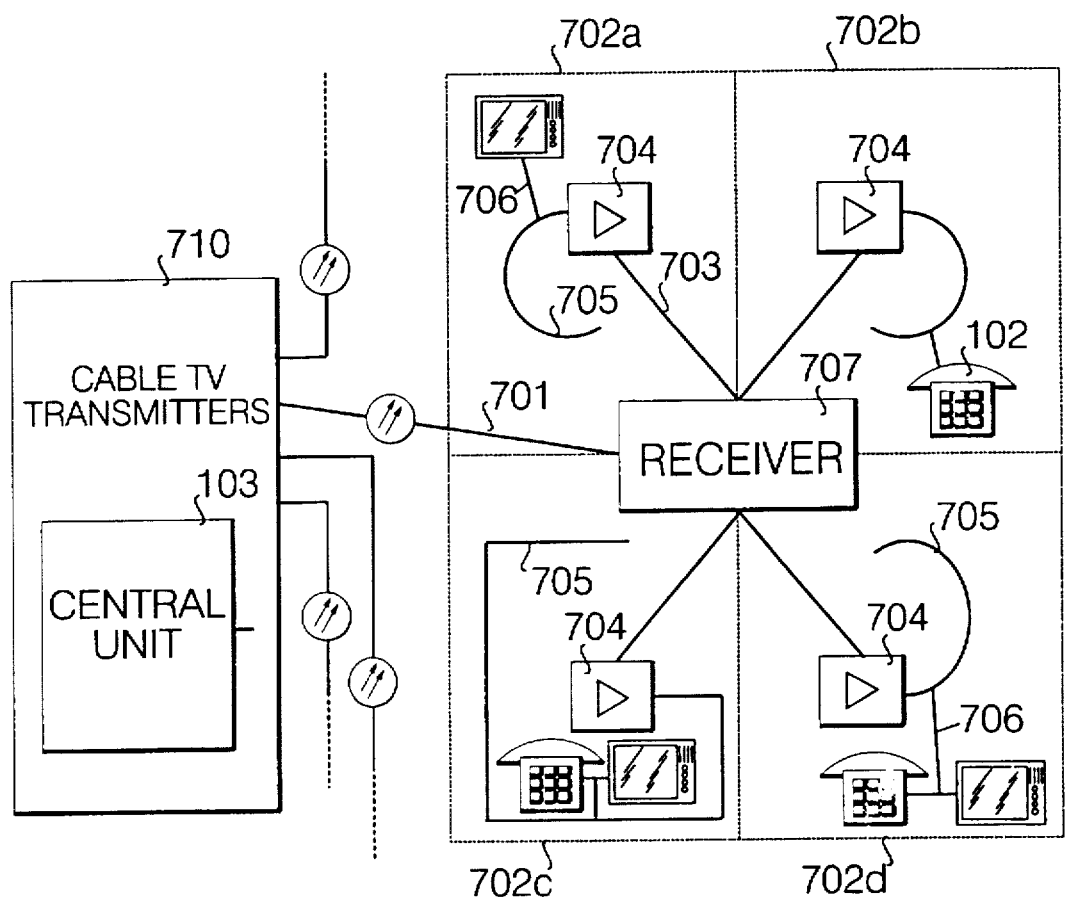
FIG. 7 shows an application of the solution according to the invention to a cable television network.

A cable television network is usually implemented as a star network, in which there is in the midpoint of the star a so-called Head End station, which is responsible for the transmission of a program to the network. From the transmission point the program is generally transmitted by means of optical fibre cable connections closer to the subscriber. The structure of one known cable television network is illustrated in FIG. 7. By optical fibre cable connections, a e.g. amplitude modulated (AM) cable television signal is brought to ranges where there are about 2100 possible cable television subscribers. The signal brought by an optical fibre cable 701 is distributed from a common receiver 707 to four cells 702a . . . 702d of 525 subscribers by means of coaxial cables 703. The cells comprise system amplifiers 704 supplying a cable 705 going to the subscribers. The cable 705 starting from the system amplifier passes via each possible subscriber within the range. When a customer decides to join a cable television network, a connection lead 706 is drawn from the line supplied by the system amplifier to the premises of the customer.

By means of a cable television network, a telephone connection according to the invention is established by positioning (in the manner shown in FIG. 7) the central unit 103 of the system in the same premises as the Head End equipment 710 and by delivering to the subscribers subscribing for a telephone connection subscriber terminals 102, which are connected in the same way as TV receivers to the cable circling in the area (because of lack of space, FIG. 7 shows only a telephone set 102 connected to a subscriber terminal). The subscriber terminal may also serve several subscribers, in which case the multipoint system according to the invention may be seen as an exchange interface of the subscriber multiplexer, and it attends at least to part of the subscriber signalling at the same time. With an increasing number of subscribers, the number of central units can be increased and the service level can be maintained as desired.

Another possible subscriber network, to which the solution of the invention can be applied, is a so-called Passive Optical Network (PON). These known networks are subscriber networks based on optical data transmission and they are becoming more and more common because of the falling prices of optical components. (At present in 1993, PONs are in test run in eastern parts of Germany, for instance.)

Figure 8:
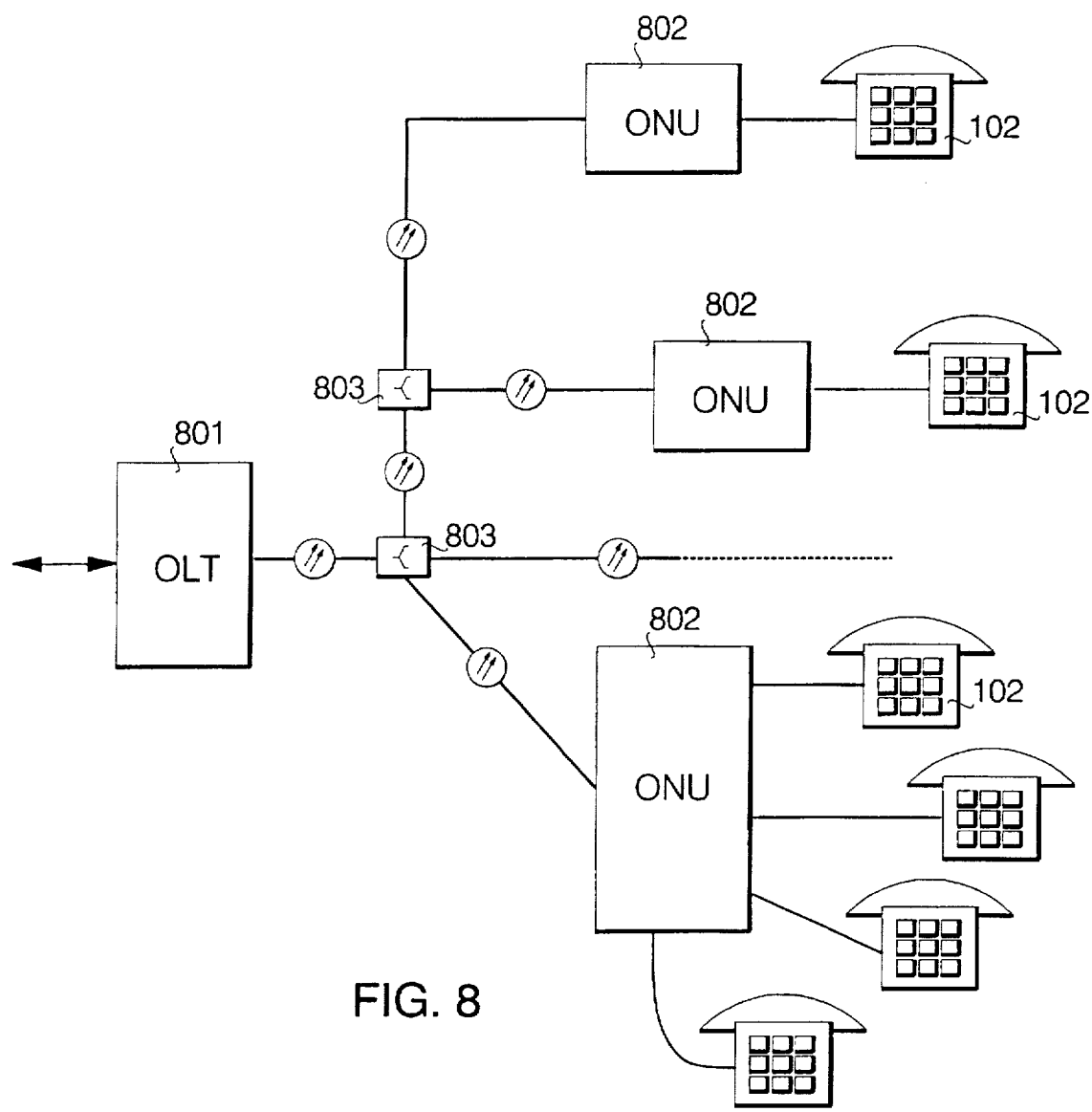
FIG. 8 shows an application of the solution according to the invention to a passive optical subscriber network.

The structure of a PON is illustrated in FIG. 8. In a PON, a transmitter unit (a so-called OLT unit, Optical Line Termination) indicated by reference numeral 801 supplies an optical branching network going towards subscribers and establishes a connection between the PON and the rest of the transmission network. The subscribers are connected to the PON by means of an Optical Network Unit (ONU) 802. The network unit 802 is connected to an optical network and forms an ordinary telephone connection, to which telecommunication terminals can be connected. Optical network units are usually available in versions adapted to different numbers of subscribers. The distance between the subscribers and the network unit is typically below 100 meters. This distance between the connections is implemented by a standard electric telephone wire, which usually is part of the internal network of the building. One PON typically comprises 300 to 400 subscribers. The total length of the networks used at present is 10 to 20 km and one network usually has 32 or 16 branchings. A PON is branched by passive dividers 803, whereby the optical power sent by the transmitter unit is distributed among all branches. The branching of the network can be made on two levels, which may cause a further decrease of the power level to be obtained by the network unit. Because of this, laser diodes efficient enough have to be used as transmitters in a PON. The network is mostly implemented in such a way that there are separate fibers for the downlink and uplink connections.

At the examination of the functions of transmitter and network units, it can be discovered that these units perform the same functions in principle as the central unit and a subscriber terminal of the network according to the invention. However, the known PON solutions differ from the solution of the invention, e.g. therein that the invention utilizes a common message-based transmission channel as described above (to the group of messages of which are included all messages relating to the operation of the network), concentration (preferred embodiment) and a bit rate of 2 Mbit/s or even less. In the known PON solutions, a bit rate of over 20 Mbit/s is used, there is no concentration, there are separate circuits for delay measurement and selection of free time slot takes place by monitoring the traffic in the target time slot.

Accordingly, the solution according to the invention can be used for providing a narrow-band POTS service in a PON. When using the solution of the invention in a PON, no big changes are necessary in the structure of the central unit and subscriber terminal with respect to what was set forth above in connection with FIGS. 5 and 6. The changes primarily concern optical parts.

PONs may also use a WDM (Wavelength Division Multiplexing) method, in which bit streams from different signal sources modulate directly transmitter lasers operating at different wavelengths and the signals are summed in an optical form into one signal. At reception, the different wavelengths can be separated from each other by a prism-type optical component, for example. Signals transmitted at different wavelengths can then be detected, each by a separate detector.

A common transmission path can also be implemented as a wireless local loop, because the subscriber sets are fixedly located and they are not moved during a call. A wireless local loop differs from radio devices of mobile traffic, such as hand telephone sets, thanks to the fact that its radio channel is easier to control. The radio technique of hand and car telephones has to be planned in such a way that phenomena occurring on the transmission channel and weakening the connection can be compensated for. On the radio channel of mobile traffic, there occur quick and slow fading, Rayleigh fading and multipath propagation. To be able to correct the influence of these connection-weakening factors, a complicated and often expensive technique must be used. On the other hand, the behavior of the transmission channel in a wireless local loop is considerably easier to predict, for local loop connections show primarily multipath propagation and slow fading. The fading problem can be decreased by using a sufficiently large system margin in radio link budget. This certainly causes additional requirements for antenna amplifications and for the sensitivity of the receivers. Handover (change of base station during a call) and roaming (mobility within the range of several base stations) functions, which are necessary in hand and car telephones, are not needed in a wireless local loop either. The absence of these functions simplifies the structure of the central unit considerably.

When applying a multipoint system to implementing a wireless connection, the strict requirements for licences to use radio systems shall be taken into account. However, it is possible to implement a spectrum efficient radio system by means of the solution according to the invention, because transmission capacity is allocated for the use of a subscriber only when there is a need to transmit. Time-division technique allows a positioning of several subscribers on the same channel, which increases the efficiency of the use of frequencies. However, it is necessary to use an efficient speech coding method for the purpose of making the bandwidth required as small as possible. In practice, a 32 or 16 kbit/s ADPCM code shall be used for speech coding, because it must be possible to transmit voice-frequency data and to use a telefax in an ordinary telephone connection without extra equipments. ADPCM coding can be combined preferably with the modulation in such a manner that a 32 kbit/s ADPCM sample is coded into one transmittable symbol so that its most significant bit is also the most significant bit of the modulation symbol. This known idea is also applicable to the equipment according to the invention.

Other possible objects of applying the invention are different "pair saving" and remote drive systems. Pair saving signifies that one subscriber line is divided among several users. The division can be made, for instance, by improving the speech coding, which makes it possible to increase the number of subscribers in the same proportion as the compression ratio of the speech improves the data transmission. For instance, a use of 16 kbit/s ADPCM coding allows an establishment of connections to four subscribers on one 64 kbit/s PCM subscriber line. Another generally used pair saving method is a frequency-divided multiplexing of different speech connections.

A pair saving method more efficient than the previous methods is provided when improvement of speech coding and concentration are combined. Then the longer number of connections provided by a more efficient speech coding can be divided, due to the benefit from the concentration, among a still bigger group of subscribers than earlier.

In the distribution of electricity for instance, data transmission connections are needed for the transmission of remote control data and for the transmission of measurement data describing the operation of an electric station to a central monitoring room. Other systems requiring remote drive, for example, gas distributing networks, passage control of railway traffic and similar systems within wide areas. The remote control of these systems has traditionally been implemented by separate data transmission networks that have not been in fixed contact with the public switched telephone network. However, to construct separate networks is economically heavy and, with the increasing reliability of operation of the public switched telephone network, ideas have been presented to implement remote drives by means of devices to be connected to a public telecommunication network.

Though the invention has above been described referring to the examples according to the attached drawings, it is clear that the invention is not restricted to them, but it can be modified within the scope of the inventive idea set forth above and in the attached claims. For instance, the network can be expanded by adding new frame structures to new radio frequencies, just as is made, e.g. in GSM mobile telephone system or other systems based on a FDMA/TDMA method. The network can also be provided with changes that are not associated with the idea of the invention; for example, it is possible to integrate a subscriber set and a subscriber terminal into the same casing. In this sense, the mentioning of separate subscriber sets and terminals shall be understood more widely.

LIST OF REFERENCES

[1]. Tanenbaum, A. S.: Computer Networks, Englewood Cliffs 1989, Prentice Hall Inc.
[2]. Ahola, K.: MUX2 toimintaseloste (description of operation of MUX2), Espoo 1992, Smartech Oy.

We claim:

1. A subscriber network arrangement for connecting subscribers to a telephone network, comprising:

a plurality of subscriber sets a plurality of subscriber terminals to each said subscriber terminal there being connected a respective at least one said subscriber set by a transmission connection implemented in an electrical form a central unit common to all of said subscriber terminals, and arranged such that a time-division data transmission between respective ones of said subscriber terminals and said central unit occurs in successive transmission frames, having plural time slots, along a common transmission path in both transmission directions from said central unit and from respective ones of said subscriber terminals;

in a transmission direction from the central unit towards said subscriber terminals, a first unidirectional message-based transmission channel being formed in a same transmission frame as actual payload data;

in a transmission direction from respective ones of said subscriber terminals towards said central unit, a second unidirectional message-based transmission channel being formed in a same transmission frame as actual payload data, for providing, as a combination of said first and second message-based transmission channels, a two-way message-based transmission channel common to all of said subscriber terminals; and said two-way message-based transmission channel being reserved for different types of system messages for transferring subscriber-specific signalling messages as well as other control messages of said subscriber network through said two-way message-based transmission channel.

2. The network arrangement according to claim 1, wherein:

said first message-based transmission channel is formed in one time slot of a frame structure of a multiplexing system.

3. The network arrangement according to claim 2, wherein:

signalling bits transmitted in said one time slot during one multiframe are arranged to form one message.

4. The network arrangement according to claim 1, wherein:

said second message-based transmission channel is formed in a message transmission time slot occurring frame at least once per.

5. The network arrangement according to claim 4, wherein:

said message transmission time slot has a duration which is unequal to the duration of data transmission time slot of a respective frame.

6. The network arrangement according to claim 5, wherein:

in transmissions from respective ones of said subscriber terminals towards said central unit, each transmission is arranged to be synchronized by timing given by a signal transmitted in an opposite direction.

7. The network arrangement according to claim 1, wherein:

said two-way message-based transmission channel arranged to be utilized for decreasing a loop delay by decreasing the relative transmission capacity allocated for signalling so that, transmissions from respective ones of said subscriber terminals towards said central unit, several transmission bursts are generated in a transmission frame per one traffic channel.

8. The network arrangement according to claim 6, wherein:

said two-way message-based transmission channel arranged to be utilized for measuring a loop delay in such a way that said central unit measures transmission path delays from a message sent by a respective said subscriber terminal on said two-way message-based transmission channel.

9. The network arrangement according to claim 1, wherein:

two-way message-based transmission channel arranged to be utilized for implementing a concentration in such a way that said subscriber terminals when respectively in idle state monitor said two-way message-based transmission channel only.

10. The network arrangement according to claim 9, wherein:

in both transmission directions, one part of available time slots is allocated for concentration and another part of time slots is fixedly allocated for predetermined subscribers.

11. The network arrangement according to claim 9, wherein:

time slots adjacent to a respective message transmission time slot are arranged to be used for a temporary expansion of said message-based transmission channel.

12. The network arrangement according to claim 9, wherein:

part of the time slots allocated for concentration are arranged to be used by predetermined ones of said subscriber terminals only.

13. The network arrangement according to claim 1, wherein:

a cable television network provides said to-way message-based transmission channel in at least one said transmission direction.

14. The network arrangement according to claim 13, wherein:

a cable television network provides said two-way message-based transmission channel in both transmission directions, whereby from said central unit to said subscriber terminals are implemented in an upper part of a cable television frequency band in an area of free cable television channels and transmissions from said subscriber terminals to said central unit are implemented in a lower part of said cable television frequency band.

15. The network arrangement according to claim 1, wherein:

an optical network provides said two-way message-based transmission channel in at least one transmission direction.

16. The network arrangement according to claim 1, wherein:

a radio path provides said two-way message-based transmission channel in at least one transmission direction.

* * * * *